Dec. 30, 1958  R. E. LEWIS ET AL  2,866,374
MONOCHROMATOR
Filed Nov. 7, 1952  5 Sheets-Sheet 1
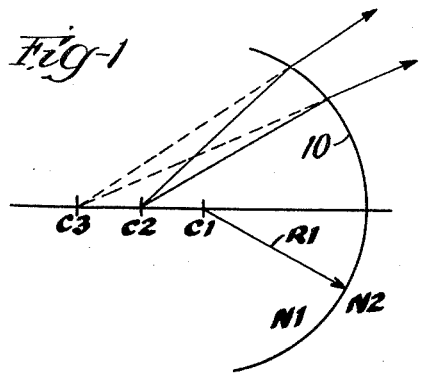
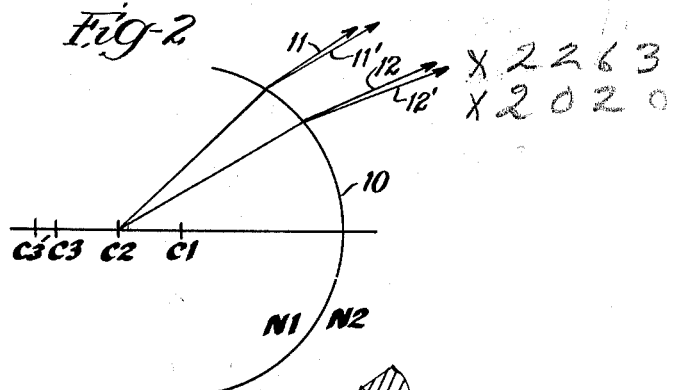
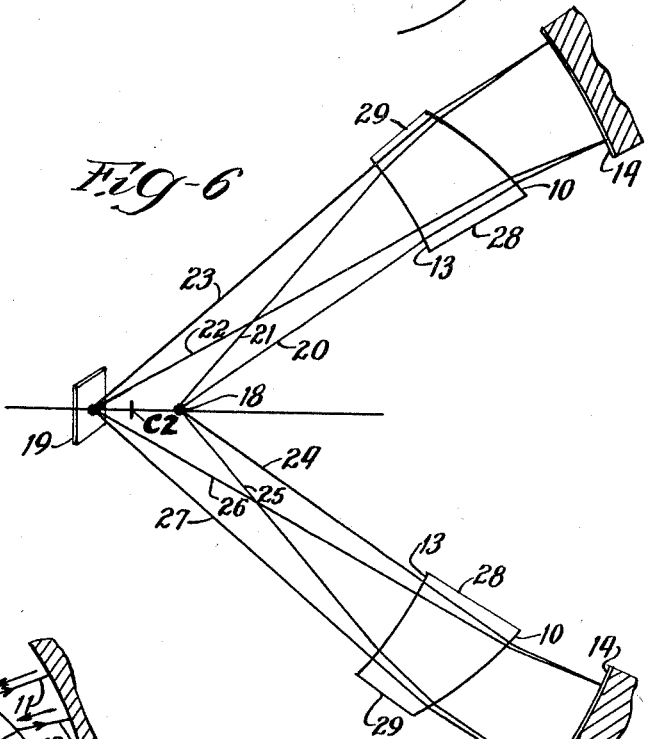
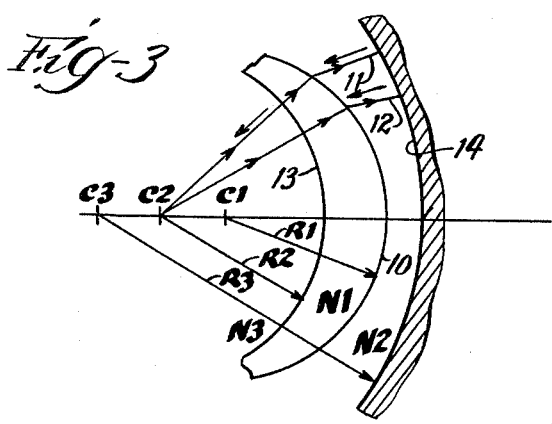
INVENTORS.
Robert Edward Lewis &
Ancil R. Thomas
By Mann, Brown and Hansmann

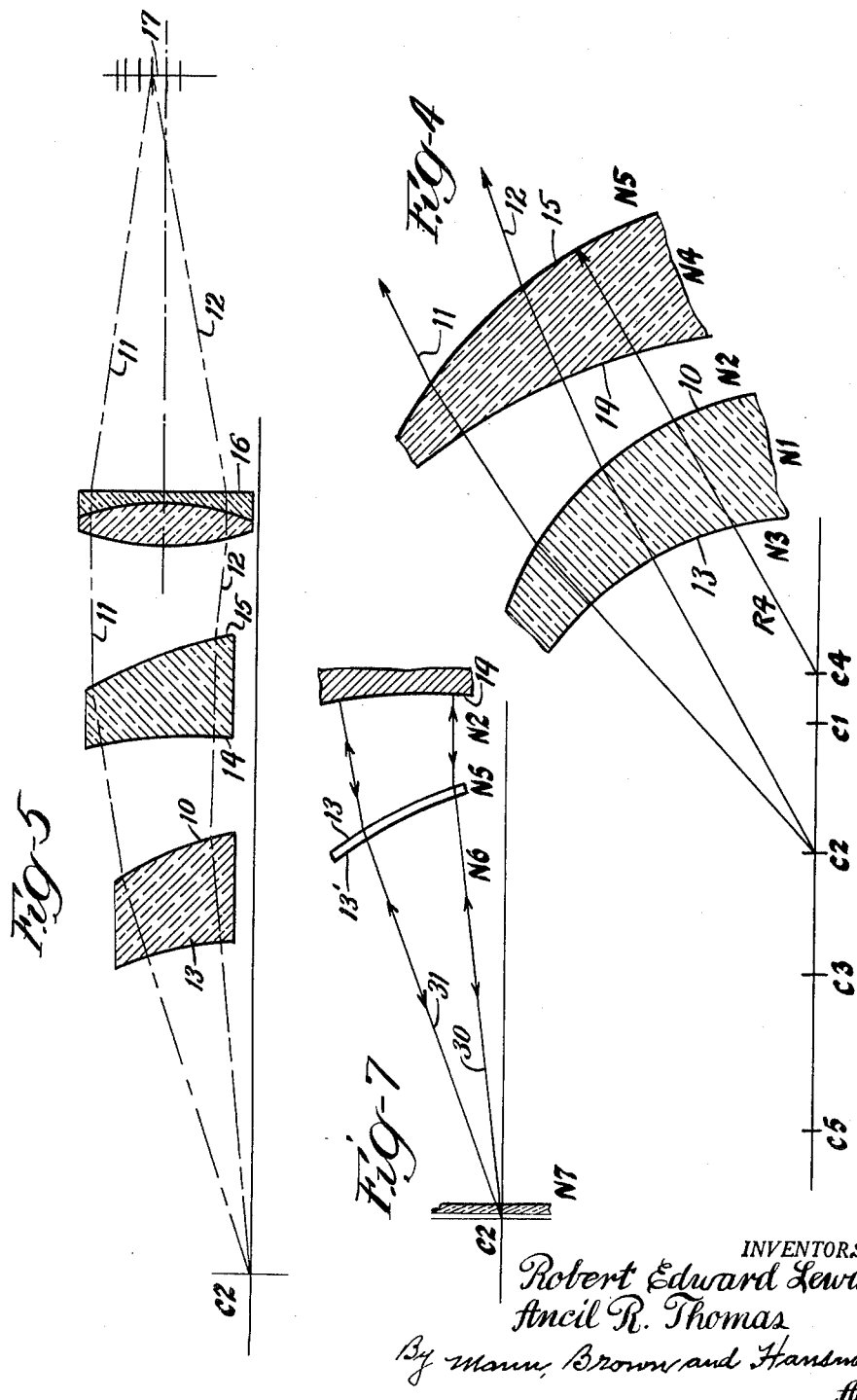

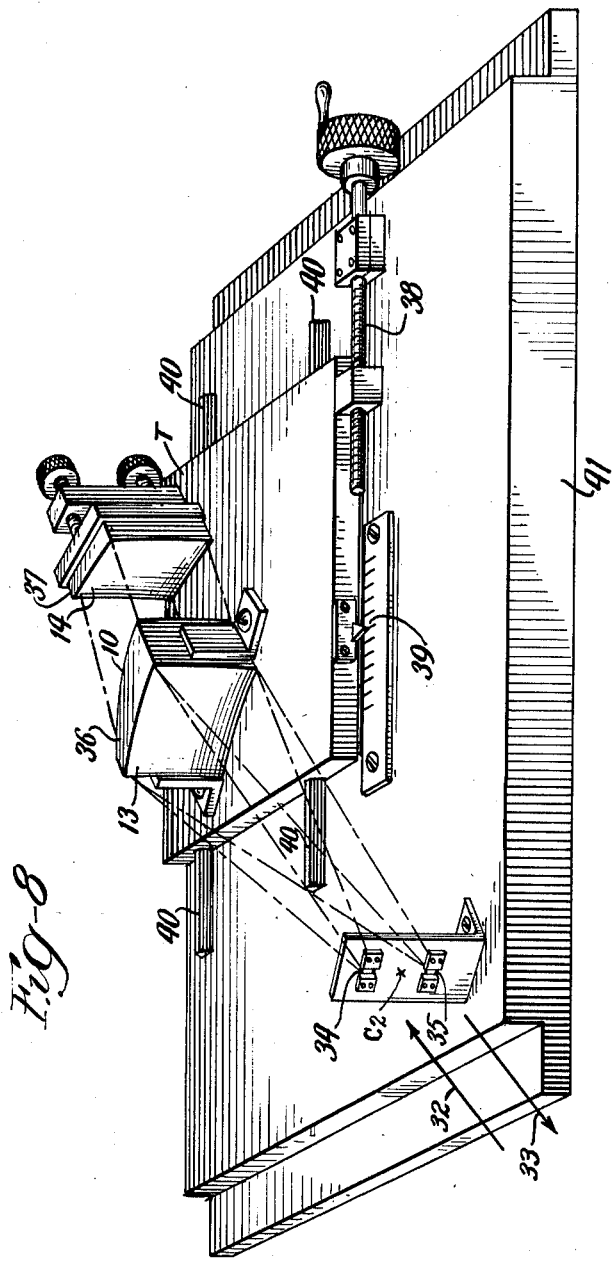

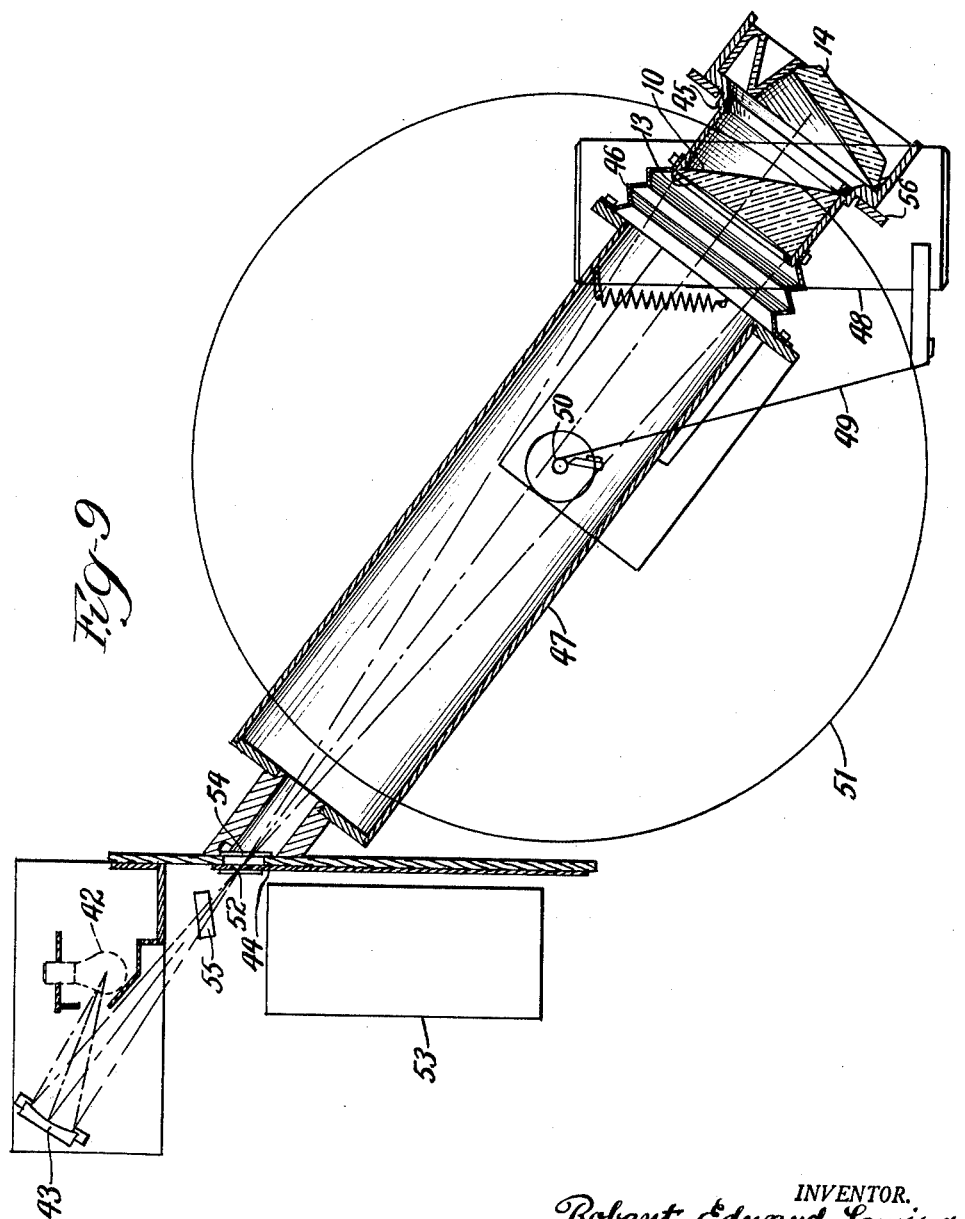

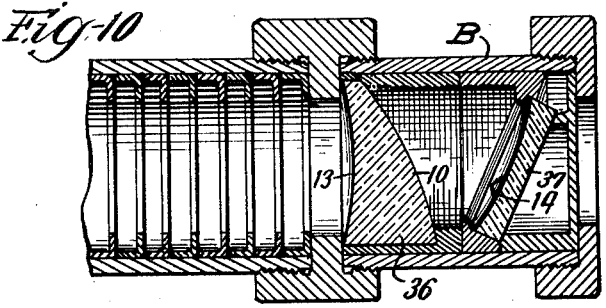
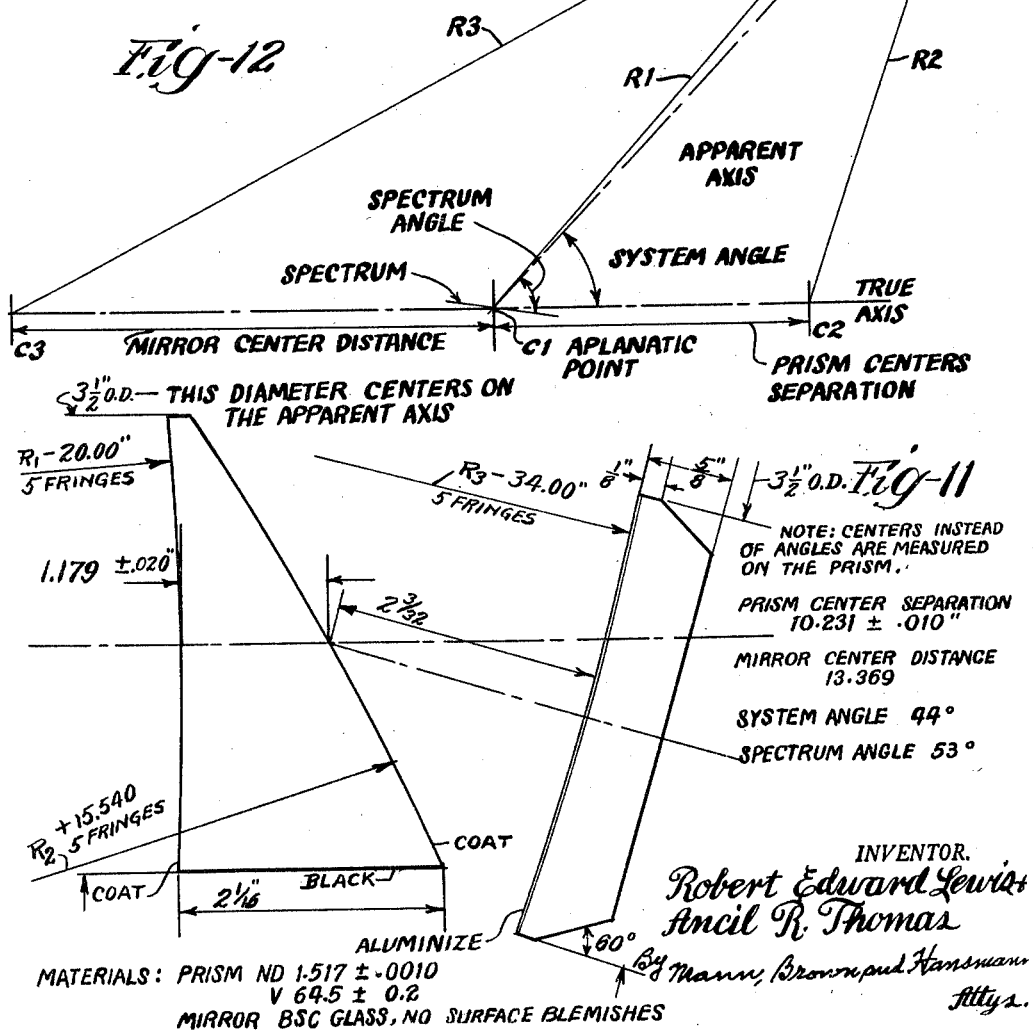

United States Patent Office 2,866,374
Patented Dec. 30, 1958

2,866,374

MONOCHROMATOR

Robert Edward Lewis, Chicago, Ill., and Ancil R. Thomas, Valparaiso, Ind., assignors, by mesne assignments, to Central Scientific Company, Chicago, Ill., a corporation of Illinois Application November 7, 1952, Serial No. 319,262

1 Claim. (Cl. 88—14)

The principal object of this invention is to produce a monochromator that will give a narrow wave length band of light of high purity and high luminosity, and that will lend itself to quantity production at low cost.

Generally speaking this is accomplished by taking advantage of the chromatic aberration of an aplanatic lens system to produce a spectrum, which aberration is further increased by the light being returned upon itself by reflecting the emergent spherical wave front back through the dispersing element.

For example:

An aplanatic lens element placed with regard to the source is masked to expose only the outer portion of the lens, thus making use of that portion wherein the greatest chromatic aberration occurs. The emergent cone of light, for the aplanatic design wavelength, appears to come from a second aplanatic point in line with the centers of curvature. This cone of light is reflected back upon itself by a spherical mirror concentric with the second aplanatic point, thus doubling the chromatic dispersion.

Further objects and advantages of the invention will appear as the disclosure proceeds and the description is read in connection with the accompanying drawings, in which Fig. 1 is a diagram of the elements of an aplanatic system for the monochromatic design wavelength;

Fig. 2 is a diagram of the chromatic dispersion of Fig. 1;

Fig. 3 is a diagram of an optical system of Fig. 1 shown with the addition of a retrodirective mirror;

Fig. 4 is a diagram of the optical element of Fig. 1 with a second aplanatic refracting element;

Fig. 5 is a diagram of a monochromator including the invention and employing a collimating type objective to image the spectrum;

Fig. 6 is a diagram of a plane section through the axis of a concentric ring type retrodirective aplanatic monochromator with point source and the matching round aperture slit;

Fig. 7 is a diagram of a retrodirective system similar to that of Fig. 1 for use with liquid refractive material;

Fig. 8 is a sketch of a monochromator embodying the invention;

Fig. 9 is a modified form with hermetically sealed optics;

Fig. 10 is a section through optical elements designed and arranged according to the invention and mounted in the lens barrel or tube;

Fig. 11 is a diagram of a monochromator including a dispersing element and mirror made according to the invention and suitable for a transmission spectrophotometer; and Fig. 12 is a design of an optical system including the monochromator of Fig. 11 in a transmission spectrophotometer.

In Fig. 1 there is shown an optical system wherein the spherical surface 10 is the boundary between refractive materials of index $n_1$ and $n_2$, the former being the material within the sphere of radius $R_1$. For every such spherical surface there is a point or axial position which satisfies the requirements of freedom from spherical and comatic aberration for every useful zone of the lens for a given monochromatic radiation. This condition occurs when $n_2$ is the refractive index of air (which is substantially equal to one) if the distance between $C_1$ and $C_2$ is equal to the ratio of $R_1$ over $n_1$ which may be expressed algebraically as:

$$C_1C_2 = R_1/n_1$$

A discussion of this will be found in Hardy and Perrin, Principles of Optics, McGraw Hill Book Company (New York, 1932). A detailed study of the use of aplanatic design concepts in optical systems is found in Conrady, Applied Optics and Optical Design, Oxford University Press, London, 1929.

Thus when the aplanatic design conditions are achieved, a point object at $C_2$ appears, without aberration, to be at $C_3$ if the light wave length is the same as that for which the index of refraction $n_1$ was taken as used in the aplanatic calculations. In the case of Fig. 1 it is assumed for illustrative purposes that the object at $C_2$ is a point light source in the same medium of index $n_1$ as the surface 10.

If the wavelength of the light varies, the index of refraction $n_1$ varies. In Fig. 2 the variation in refraction is shown by rays 11' and 12' both of which appear to come from a common point $C_3'$ substantially on the axis instead of the original design center $C_3$. Thus it will be seen that a fixed optical system is aplanatic in the rigorous sense, only for one wavelength of light, but that if the distance $C_1C_2$ is varied in accordance with the variations of $n_1$ with the wavelength of light, the system may be made to remain aplanatic in function over a wide range of wavelengths. This characteristic of a monochromator using aplanatic optics is phenomenal in view of the problems of correction of spherical aberration in conventional type equipment.

In Figs. 1 and 2 the source, for illustrative purposes, was within the refractive medium of index $n_1$, but such an arrangement is not convenient. In Fig. 3 the radius $R_2$ is centered upon $C_2$, the source, and chosen to be of any length convenient in the manufacture of the device, the concentricity being the important feature. Rays leaving $C_2$ therefore impinge upon spherical surface 13, of radius $R_2$ at normal incidence and therefore pass undeflected or unrefracted into the refracting material of index $n_1$. This method of determining the character of $R_2$ enables the surface 10 of $R_1$ to receive rays or wavefronts exactly the same as if $C_2$ were within the same medium as in Fig. 1. As the surface 13 of radius $R_2$ has no optical power in the same sense of focal power as used in this system, the index $n_3$ has no importance in the performance of the instrument. It may be air, water, vacuum or gas as desired. In the case of air then radii $R_1$ and $R_2$ define a lens in air of spherical surfaces 10 and 13.

As in the case of $R_2$, the same no power surface construction may be used after the rays have been refracted at surface 10. In this case the emergent rays appear to come from $C_3$, and any spherical surface centered thereupon becomes a zero-power surface contributing neither focal power nor aberration. Such a spherical surface, designated as 14 of radius $R_3$ is shown in Fig. 3, it being aluminized or otherwise mirrorized to return the light upon itself as shown for rays 11 and 12. Thus for the wavelength of aplanatic design, the image of the source is thrown back upon the source with system of Fig. 3. This retrodirective system consists of one spherically surfaced refracting element and one spherically surfaced concave mirror. These are capable of manufacture by conventional optical machinery and processes. This property of having only sperical surfaces is of interest in view of the fact that conventional monochomator constructions employing conventional optical systems are able to achieve only a limited amount of spherical aberration correction over a limited wavelength range. This problem is acute when a good light gathering ability is required in which case very expensive off-axis parabolic mirrors are used as in the well known Littrow system.

The system of Fig. 3 has no lateral chromatic aberration at the axis. The rim of the lens is the most useful portion. It has been verified theoretically and experimentally that the difference in chromatic dispersion between the edge and a small inwardly displaced zone is negligible in the instance of an outer rim element approximating a 30 degree dispersing element.

In Fig. 3, as 13 is a no-power surface, the index $n_3$ has no optical function. Under these conditions the space between 13 and the aplanatic point may be filled with liquids, gases or similar substances for absorption studies. It will be noted that this area provides an absorption cell of uniformly equal path length.

Whereas previous illustrations have dealt with the effects of a single surface with power, the principles described herein are not limited to one power surface. In Fig. 4 is illustrated a system with two surfaces of power constructed as follows: the surfaces 10 and 13 are the same as in Fig. 3, being aplanatic for a source at $C_2$ which appears to be at $C_3$ upon emergence. These emergent rays strike the no-power surface 14 and proceed to surface 15 through material of index $n_4$. The surface 14 is of zero power as its center coincides with the ray center $C_3$. Surface of 15 is again chosen so that surface $R_4$ causes rays 11 and 12 to emerge without spherical aberration due to the ratio:

$$C_4C_3=R_4/n_4$$

By the addition of a suitably constructed objective, the aplanatic dispersing systems of one or more elements may be used as shown in Fig. 5, wherein rays 11 and 12 which would normally converge at point $C_5$ are converged to a focus by the objective 16 to form the spectrum 17.

An entire ring or outer annulus of a lens having its central portions removed as indicated at 28 and an outer edge surface cut away as indicated at 29 with associated mirror 14 as an aplanatic monochromator is shown in Fig. 6. In this system the small source 18 is displaced from the center $C_2$ and the aperture or slit type system 19 is displaced the other way. This ring construction, shown in plane section, is capable of extremely high light, gathering power without appreciable loss of specular purity. As all surfaces are spherical, apparent effective apertures of $f/1$ may be exceeded with ease.

In Fig. 6 rays 20, 21 and 24, 25 are sections of cones from the source which return as rays 22, 23 and 26, 27, respectively, to light the aperture mask. In the case of microscopy systems this system provides a high output monochromator system which may be used to illuminate the stage directly or by additional optics.

In the instance of Fig. 1, it was remarked that the source was for illustrative purposes placed in medium of index $n1$. As this is not convenient, an alternative suggests itself as shown in Fig. 7. The aplanatic center $C_2$ is on the surface, or just beyond a thin flat window of index $n7$. Rays 30 and 31 travel thence through liquid of index $n6$ and are refracted by the spherical surface formed by the thin spherical surfaced window of index $n5$. The radii 13 and 13' correspond in such a fashion that the difference between the two introduces negligible power. In this system a fluid of variable color or index or refraction may be used to fill the cavity between 13' and $C_2$ and the system used to provide control for said liquid in terms of the variations of the monochromator output which may be detected by eye, photocell, or photometer system.

For systems of $f/2$ or less equivalent light gathering power, the ring of Fig. 6 has little merit and the use of small sectors of the ring is more economical. An example of such an apparatus is shown in Fig. 8 in which a base 41 supports a movable table Γ on slideways 40. The refractive element 36 has surfaces 13 and 10 designed about the aplanatic point $C_2$ between the entrance slit 34 and exit slit 35. The retrodirective mirror 37 with surface 14 is also mounted on the movable table T which is positioned by the mechanism 38 indicated by the wavelength scale 39.

The entrant illumination 32 going through the slit 34 and the exit slit 35 and its emergent light 33 show a marked degree of plane to plane, point to point similarity for a monochomatic radiation, which is to say there is an object image relationship. Slightly misaligning element 36 or the face 13, though only by a negligible amount, will direct first surface reflections by face 13 away from symmetrical relation with $C_2$ and thus take reflections by face 13 or slit 34 out of alignment with slit 35. This deliberate change from the rigorous design alignment removes white light dilution from the exit slit in a systematic manner such that it is possible to predict with certainty that greater spectral purity is possible than with a system involving plane faced optical surface, or axially centered spherical surfaces, both of which reflect a virtual image.

Fig. 9 illustrates another construction of an aplanatic monochromator. The source in this example is built onto the frame, being a lamp 42 which is imaged on the slit 52 by the optics 43.

The slit 52 is mounted upon a movable member 44 which allows selection of one pair of several fixed slits.

The light after leaving the slit 52 passes through an optional port window 54 and into the body chamber of the system which also serves as the light tight, gas tight chassis. At the other end of the body chamber tube, a flexible gas-tight bellows or sylphon 46 couples the chamber to the movable optical element cell 45 and which mounts the refracting element of surfaces 10 and 13 and the retrodirective mirror 14. This mount is of cylindrical or tubular type which permits rotational orientation of the elements and mount rings to adjust them. This cell assembly is mounted on the carriage 48 which travels parallel to the axis defined by the centers $C_1$, $C_2$ and $C_3$, as shown in Fig. 1.

The wavelength position of the carriage is controlled in this example by winding the thin tape 49 about the shaft 50 upon which the wavelength drum 51 is mounted. This sealed body chamber construction permits the retention of special atmospheres as may be required for special or hygroscopic refractor elements for use in the infrared or other regions. This also contributes to reduction of maintenance labor by excluding corrosive chemical fumes.

The return light pases through the slit 52 to be reflected at 55 to the receptor 53 which may be either a photocell, thermopile, photometer, microscope, or other device. While the system in Fig. 9 is shown with a simple lamp source it is understood that the source and receptor functions may vary widely with various uses of the monochromator. By using the face 56 as a mount, the cell 45 can be made interchangeable with other cells permitting the instrument to be more versatile.

In the above illustrations it is understood that the specific examples cited are specific instances, there being a number of different systems and instruments possible which utilize the basic construction of the aplanatic monochromator.

In Fig. 10 a refractive element 36 and a retrodirective mirror 37 are mounted in a tube or barrel B with suitable accompaniments.

In Fig. 11 a refractive element and a retrodirective mirror embodying the invention are shown with data that make a clear description.

Fig. 12 shows a design of an optical system including the elements of Fig. 11.

We claim:

An optical system comprising a refractive optical element having a concave spherical surface and a convex spherical surface, one aplanatic point of the convex surface being at the center of curvature of the concave surface, a slit positioned at the center of curvature of the concave surface, a light source in alinement with said slit opposite said optical element, a spherical reflector adjacent said optical element facing the convex surface thereof opposite said slit, the center of curvature of said spherical reflector being the other aplanatic focus of the convex surface of the optical element, said light source, slit, refractive element and reflector being optically alined along an axis, and means for moving the optical element and reflector as a unit toward and from the slit along the axis of said element and reflector.

References Cited in the file of this patent

FOREIGN PATENTS

| 255,788 | Germany | Jan. 22, 1913 |
| 441,595 | Germany | Mar. 7, 1927 |
| 712,329 | Germany | Oct. 16, 1941 |
| 625,906 | France | May 2, 1927 |
| 925,922 | France | Apr. 14, 1947 |

OTHER REFERENCES

Theory of Modern Optical Instruments, 2nd edition, 1921, His Majesty's Stationary Office, London, page 338 cited, by Gleichen.

"Mirrors, Prisms and Lenses," 1923 edition, by Macmillan Co., New York City, pages 617–619, by Southall.

"Fundamentals of Optical Engineering," first edition (1943), by McGraw-Hill Book Co., New York City, pages 393–395, by Jacobs.

Light For Students, published in 1944, by Macmillan and Co., London, pages 76–79 cited, by Edser.